United States Patent
Iino et al.

(10) Patent No.: US 10,827,080 B2
(45) Date of Patent: Nov. 3, 2020

(54) VIBRATION GENERATION DEVICE AND ELECTRONIC APPARATUS

(71) Applicant: SEIKO INSTRUMENTS INC., Chiba-shi, Chiba (JP)

(72) Inventors: Akihiro Iino, Chiba (JP); Masao Kasuga, Chiba (JP); Jun Shinohara, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 785 days.

(21) Appl. No.: 15/581,630

(22) Filed: Apr. 28, 2017

(65) Prior Publication Data
US 2017/0331349 A1 Nov. 16, 2017

(30) Foreign Application Priority Data

May 16, 2016 (JP) .................................. 2016-098104
Jan. 18, 2017 (JP) .................................. 2017-006755

(51) Int. Cl.
*H04M 19/04* (2006.01)
*B06B 1/16* (2006.01)

(52) U.S. Cl.
CPC ........... *H04M 19/047* (2013.01); *B06B 1/164* (2013.01); *H04M 19/04* (2013.01)

(58) Field of Classification Search
CPC ........ A61F 13/551; G07F 11/00; G07F 11/04; H02K 5/167; H02K 7/06; H04M 19/04;
(Continued)

(56) References Cited

U.S. PATENT DOCUMENTS 4,570,616 A * 2/1986 Kunz ................. A61H 23/0263
601/57
6,217,533 B1 * 4/2001 McCambridge ... A61H 23/0263
601/56
(Continued)

OTHER PUBLICATIONS

Drawing and English-language translation of abstract and claims, Publication No. 2015-112013, Publication Date Jun. 18, 2015.
(Continued)

*Primary Examiner* — Tran N Nguyen
*Assistant Examiner* — Leda T Pham
(74) *Attorney, Agent, or Firm* — Adams & Wilks

(57) ABSTRACT

An electronic apparatus is configured to generate a variety of vibrations corresponding to a variety of different situations without excessively high power consumption. The electronic apparatus has first and second vibration motors having respective eccentric weights different in weight from each other for generating different first and second vibrations. An input/output section enables a user to select from a list of events stored in a storage section first events and second events. A controller drives the first vibration motor having a heavier weight with a strong vibration upon occurrence of the user-selected first events and drives the second vibration motor having a lighter weight with a weak vibration upon occurrence of the user-selected second events. The first events include an incoming phone call or email, a present alarm time, and a dynamic or important action, motion, and so on in a computer game. The second events include confirming input operations by the user, and a minute action, motion, and so on occurring in a computer game. The correspondence between the vibration motors and the events is selectable by the user.

8 Claims, 11 Drawing Sheets

(58) Field of Classification Search
CPC ....... H04M 19/047; H04M 1/00; B06B 1/164; B06B 1/16; G06F 3/01; G06F 3/0488
See application file for complete search history.

(56) References Cited

U.S. PATENT DOCUMENTS

| | | | | |
|---|---|---|---|---|
| 9,101,959 | B2* | 8/2015 | Burton | B06B 1/16 |
| 2010/0245061 | A1* | 9/2010 | Cassidy | G07F 7/10 |
| | | | | 340/407.1 |
| 2014/0002248 | A1* | 1/2014 | Zawacki | G06F 3/016 |
| | | | | 340/407.1 |
| 2014/0260723 | A1* | 9/2014 | Ely | G06F 3/016 |
| | | | | 74/87 |

OTHER PUBLICATIONS

Drawing and English-language translation of abstract and claims, Publication No. 2016-007114, Publication Date Jan. 14, 2016.

\* cited by examiner

Fig.6 (a) VIBRATION PATTERN OF FIRST VIBRATION MOTOR 71
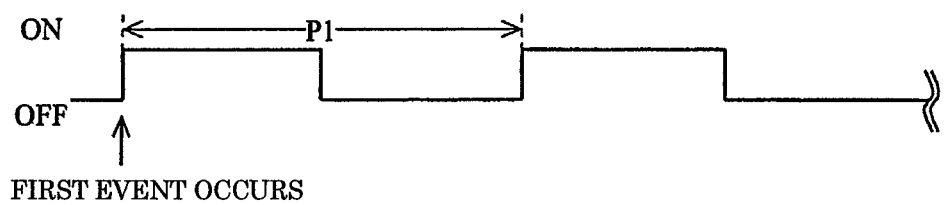
FIRST EVENT OCCURS
Fig.6 (b) VIBRATION PATTERN OF SECOND VIBRATION MOTOR 72(73)
PATTERN A
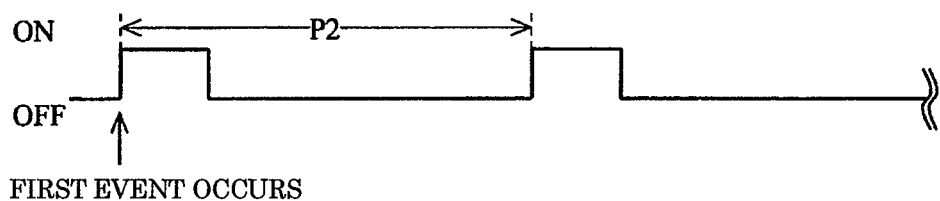
FIRST EVENT OCCURS
PATTERN B
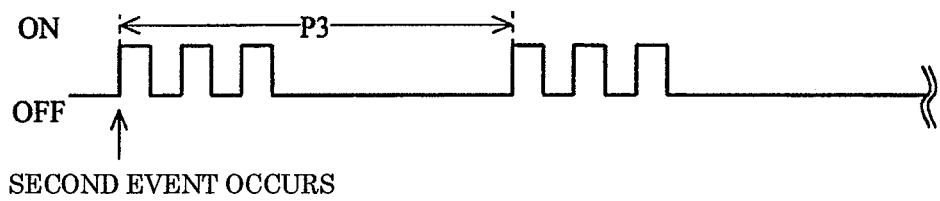
SECOND EVENT OCCURS
PATTERN C
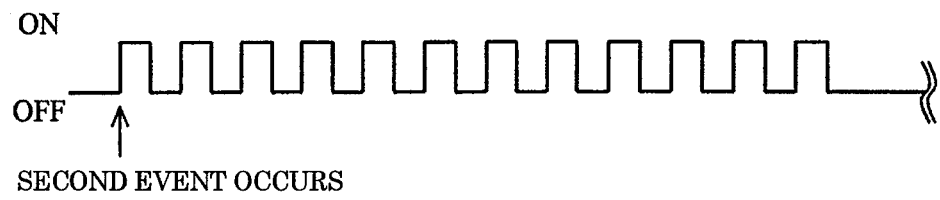
SECOND EVENT OCCURS

VIBRATION GENERATION DEVICE AND ELECTRONIC APPARATUS

BACKGROUND OF THE INVENTION

Field of the Invention

The invention relates to a vibration generation device and an electronic apparatus, and relates to a technology of transmitting information using a vibration in an information electronic apparatus such as a smartphone, a cellular phone, and a touch panel having a switch function in a vehicle or the like.

Background Art

In recent years, in such an information electronic apparatus as a cellular phone, a smartphone, a tablet terminal, or a touch panel having a switch function in a vehicle or the like, it is becoming to provide a variety of types of information using a vibration.

For example, besides giving notice of incoming of a call or a mail with the vibration, and giving notice of coming of preset time with the vibration, the vibration is used when the user has touched a display of the information electronic apparatus or a variety of buttons arranged on the display as confirmation of the operation.

Further, in the electronic apparatus such as a game machine, in order to provide the user of the game machine with a variety of tactile senses coupled to actions and event items occurring during the use of the game, there is used a technology of generating a variety of vibrations coupled to the actions and the event items.

In JP-A-2016-7114, a technology of using a vibration motor having an eccentric weight fixed to a rotary shaft of a rotary motor is described as a technology of generating the vibrations described above.

Further, in JP-A-2015-112013, there is described a technology of using a linear-type vibration motor for reciprocating (vibrating) a weight fixed to a magnet using the magnetic force of a solenoid.

Among the vibrations for giving notice of the variety of situations described above in the vibration motor, a "vibration for giving notice of incoming," which can occur under the situation in which the user does not have the electronic apparatus as a vibration source in hand, for example, needs to be a relatively strong vibration in order to make the user aware of the incoming. In order to generate such a strong vibration, it is necessary to provide a large eccentric weight to the vibration motor. However, if the eccentric weight is enlarged, the response performance of the vibration motor deteriorates accordingly.

In contrast, a "vibration for operation confirmation" for giving notice of an input operation and the tactile sense during a game has a high possibility of occurring under the state in which the user has the electronic apparatus as a vibration source in hand, and has a high possibility that the user and the electronic apparatus have contact with each other. Therefore, in many cases, the vibration for operation confirmation is not required to be such a strong vibration as the "vibration for giving notice of incoming" described above.

If it is attempted to generate the "vibration for operation confirmation" using the vibration motor provided with such a large eccentric weight as described above, the response performance of generating the vibration immediately corresponding to an instant motion of a finger touching a display as an example of the input operation is insufficient, or it is difficult to instantly communicate a variety of fine tactile senses in the game with the vibrations.

Further, if it is attempted to improve the response performance of the vibration motor provided with the large eccentric weight, there is a possibility that a huge amount of power consumption becomes necessary.

SUMMARY OF THE INVENTION

Therefore, the invention has an object of generating a variety of vibrations corresponding to a variety of situations without making the power consumption excessively high.

(1) According to a first aspect of the invention, there is provided a vibration generation device including a first vibration motor provided with a first weight and adapted to one of rotate and reciprocate the first weight to generate a vibration, a second vibration motor having smaller time constant than the first vibration motor provided with a second weight and adapted to one of rotate and reciprocate the second weight to generate a vibration, and a vibration controller adapted to drive the first vibration motor in accordance with a first event, and adapted to drive the second vibration motor in accordance with a second event different from the first event.

(2) According to a second aspect of the invention, in the vibration generation device according to the first aspect of the invention, the second weight is lighter in weight than the first weight.

(3) According to a third aspect of the invention, in the vibration generation device according to one of the first and second aspects of the invention, the first vibration motor is a rotary-type motor, and the second vibration motor is a linear-type motor.

(4) According to a fourth aspect of the invention, in the vibration generation device according to any one of the first through third aspects of the invention, the first vibration motor and the second vibration motor are disposed so that a direction of the vibration generated by the first vibration motor and a direction of the vibration generated by the second vibration motor are nonparallel to each other.

(5) According to a fifth aspect of the invention, in the vibration generation device according to any one of the first through fourth aspects of the invention, the vibration controller performs either one of first control, in which drive of the second vibration motor is halted during a drive period of the first vibration motor, and second control, in which the second vibration motor is driven during the drive period of the first vibration motor, in a case of driving the first vibration motor in preference to the second vibration motor.

(6) According to a sixth aspect of the invention, there is provided an electronic apparatus including the vibration generation device according to any one of the first through fifth aspects of the invention, at least either one of an incoming detector adapted to detect incoming to an own terminal, and a preset time coming detector adapted to detect coming of preset time received, and an input receiver adapted to receive input with one of a touch and a press, wherein the first event corresponds to at least either one of the incoming to the own terminal detected by the incoming detector, and the coming of the preset time detected by the preset time coming detector, and the second event corresponds to one of the touch and the press received by the input receiver.

(7) According to a seventh aspect of the invention, in the electronic apparatus according to the sixth aspect of the invention, there is further included a correspondence event setting unit adapted to receive setting and a change of the first event and the second event to be made to correspond to the first vibration motor and the second vibration motor.

(8) According to an eighth aspect of the invention, in the electronic apparatus according to one of the sixth and seventh aspects of the invention, the input receiver is a touch panel.

According to the invention, by providing a plurality of vibration motors different in weight from each other, it is possible to provide a vibration generation device and an electronic apparatus capable of generating appropriate vibrations corresponding to a variety of situations without making the power consumption excessively high.

BRIEF DESCRIPTION OF THE DRAWINGS

FIGS. 1A through 1C are each a schematic external configuration diagram of an electronic apparatus, wherein FIG. 1A shows a smartphone.

FIGS. 6A and 6B are diagrams for explaining vibration patterns related to the vibration generation device.

DETAILED DESCRIPTION OF THE INVENTION

Hereinafter, a preferred embodiment in the vibration generation device and the electronic apparatus according to the invention will be described in detail with reference to FIG. 1 through FIG. 11.

(1) Outline of Embodiment

The electronic apparatus according to the present embodiment is provided with two vibration motors having respective eccentric weights different in weight from each other, and drives a first vibration motor having a heavier one of the eccentric weights in the case of giving notice of the fact that an event, for which notice with a strong vibration is necessary or effective, has occurred and/or is occurring.

There is adopted a configuration of driving a second vibration motor having a lighter one of the eccentric weights in the case of giving notice of the fact that an event, for which a quick response or a response performance is required, has occurred and/or is occurring, in contrast.

It should be noted that the event to be announced using the heavier one of the eccentric weights is defined as a first event.

The first event includes, for example, the following situations.

(i) incoming
(ii) coming of time at which an alarm has been set
(iii) a significant or important action/motion occurring in the game Further, the event to be announced using the lighter one of the eccentric weights is defined as a second event.

The second event includes, for example, the following situations.

(iv) confirmation of an input operation performed by touching or pressing a screen of the electronic apparatus
(v) a minute action/motion occurring in the game Further, the first vibration motor and the second vibration motor are configured to be able to select which one of the vibration motors is made to correspond to what event.

According to this configuration, it is possible to generate the vibrations different in type, namely a "strong vibration" and a "weak vibration with a high response performance while suppressing the power consumption at the start-up," in accordance with a variety of situations.

(2) Details of Embodiment

Figure 1A:
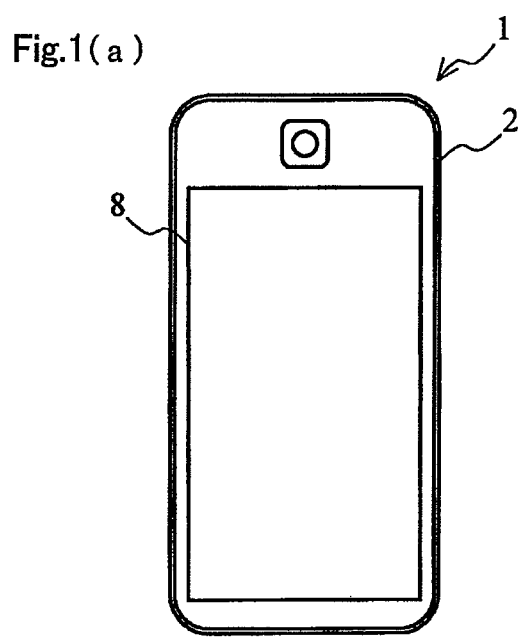
Figure 1B:
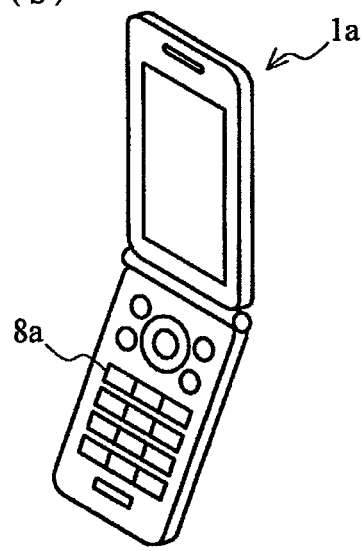
Figure 1C:
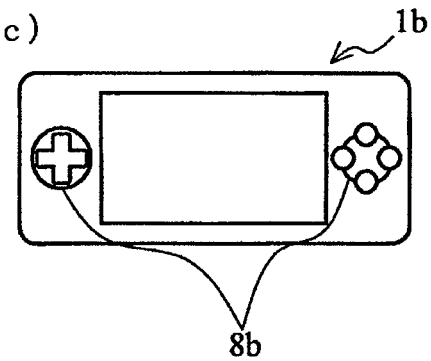

FIG. 1 is a schematic external configuration diagram of a smartphone 1 to which the present embodiment is applied.

In the present embodiment, the description will be presented using the smartphone 1 shown in FIG. 1A as an example of the electronic apparatus.

A housing 2 is a housing forming an outer shape of the smartphone 1, and incorporates an acceleration sensor, a gyroscope, a battery, and a variety of electronic circuits none of which are shown.

Further, on either of the side surfaces of the housing 2 or the like, there is disposed a power switch not shown. The power switch is a switch for cutting the power supply to every section of the smartphone 1 from a power source, and is switched between a power-on state and a power-off state by operating the power switch.

A touch panel 8 is a device for detecting a touch or a press performed by the user using a unique rod-like member or an own fingertip, or receiving an input operation performed by the touch or the press.

Here, in the following description, unless particularly distinguished, the "user" denotes the user who operates the smartphone 1.

Figure 10:
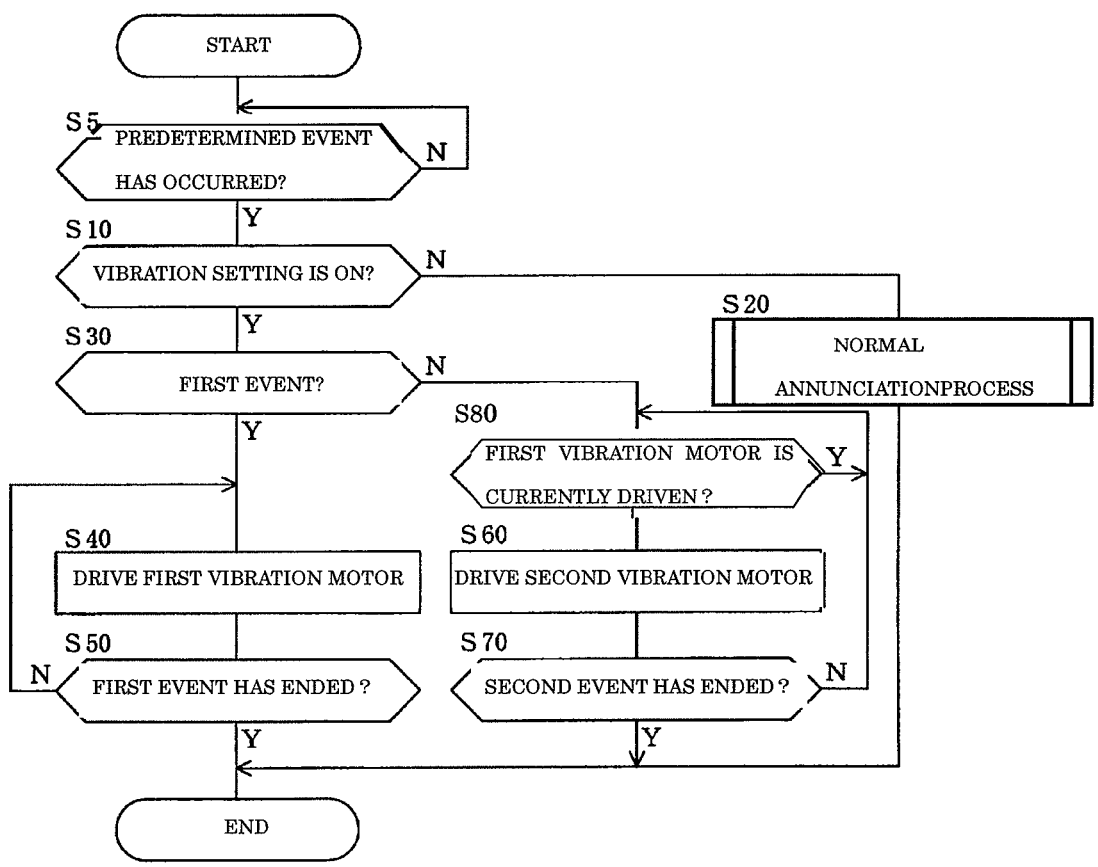
FIG. 10 is a flowchart for explaining a vibration operation related to the vibration generation device.

It should be noted that the present embodiment can also be applied to a cellular phone 1a shown in FIG. 1B, and a game machine 1b shown in FIG. 10, or a clinical thermometer, a watch, a tablet terminal and so on although not shown in the drawings.

For example, the touch panel 8 described above can be applied as a variety of input buttons besides the above, and in the case of the cellular phone 1a, it is sufficient to adopt a configuration in which a numerical keypad 8a receives an input operation by a touch from the outside.

Alternatively, in the case of the game machine 1b, it is sufficient to adopt a configuration in which operation buttons 8b receive the input operation by a touch from the outside.

Further, it is also possible to adopt a configuration provided with a tilt sensor for detecting a tilt and an acceleration sensor to thereby adopt a configuration of detecting a change in tilt of the game machine 1b during the game to generate the vibration for providing a feeling as if the operator actually exists in the game.

Figure 2:
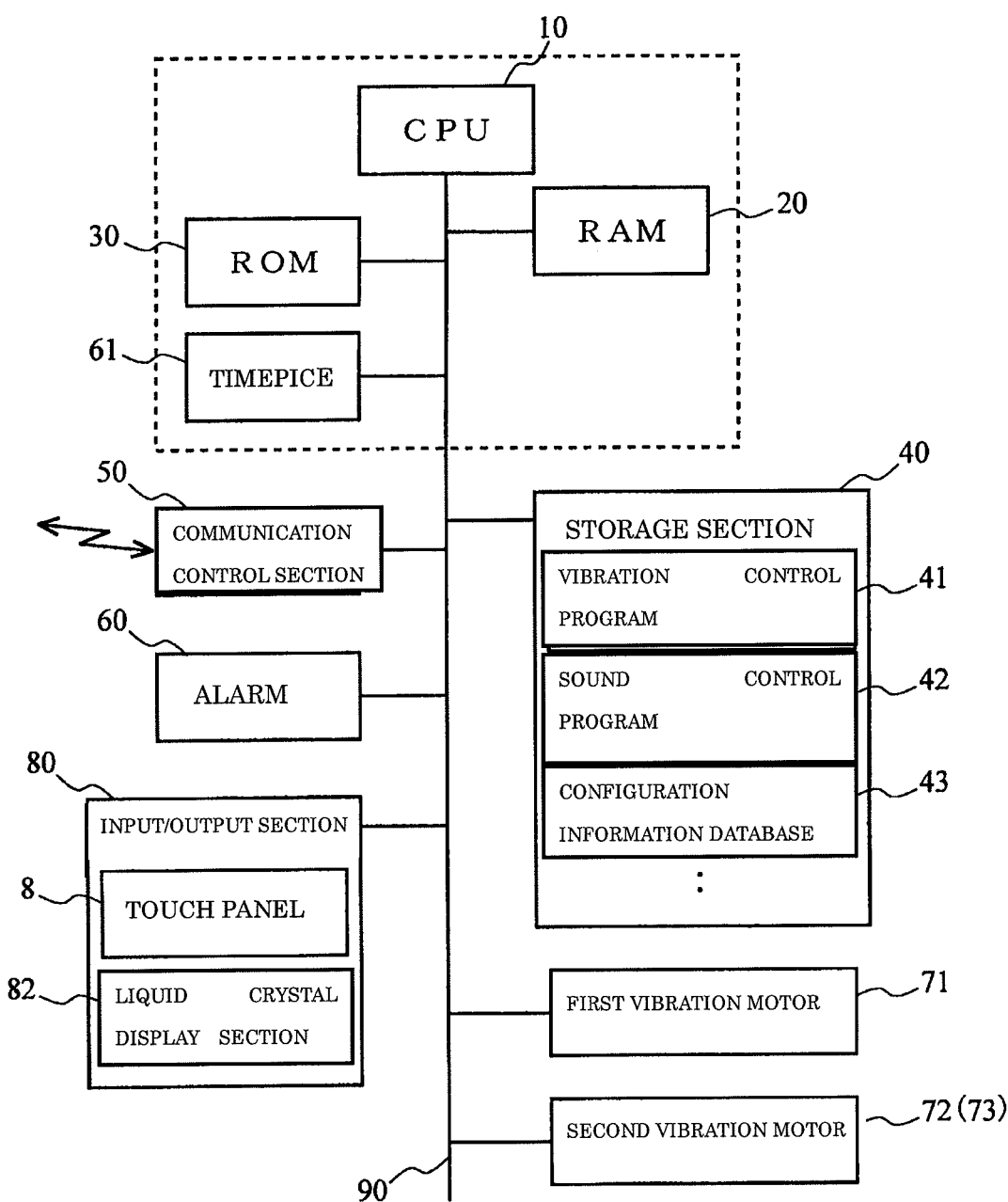
FIG. 2 is a configuration diagram of the electronic apparatus (smartphone).

FIG. 2 is a configuration diagram of the smartphone 1 to which the present embodiment is applied.

As shown in FIG. 2, the smartphone 1 according to the present embodiment is constituted by a central processing unit (CPU) 10, a random access memory (RAM) 20, a read only memory (ROM) 30, a storage section 40, a communication control section 50, an alarm 60, a first vibration motor 71, a second vibration motor 72, an input/output section 80 and so on, and a bus 90 connects these constituents to each other.

The CPU 10 is a central processing unit of the smartphone 1, and performs a variety of numerical calculations, information processing, device control and so on the RAM 20 due to a variety of control programs stored in the ROM 30 or the storage section 40. In the present embodiment, a variety of arithmetic operations related to the control of the first vibration motor 71 and the second vibration motor 72 using a vibration control program 41 in the storage section 40 are performed.

Further, the CPU 10 functions as an incoming detector for detecting incoming from other terminals based on the information output from the communication control section 50 described later.

Further, the CPU 10 functions as a preset time coming detector for detecting coming of the alarm time received from the user or the like based on the time-and-date information obtained from a timepiece 61 described later.

Alternatively, by providing the smartphone 1 with a calendar function capable of making registration of wring, canceling, or the like, it is possible to achieve the configuration of performing the detection of preset time coming cooperating with the calendar function. Specifically, it is possible to provide the CPU 10 with the configuration of detecting the fact that the registered date or the event has come based on the registered information and the time-and-date information obtained from the timepiece 61. Alternatively, it is also possible to adopt a configuration of detecting the fact that coming is going to occur, namely a day before coming, few days before coming, or a week before coming, besides the detection of the chance which has come.

The storage section 40 is a device for storing a variety of programs for making the CPU 10 of the smartphone 1 execute a variety of functions, and an arithmetic operation result of the CPU 10.

In the present embodiment, the storage section 40 stores the vibration control program 41, a sound control program 42, a configuration information database 43, and so on.

The vibration control program 41 is a program related to the operation of controlling the first vibration motor 71 and the second vibration motor 72 to generate the vibration. It should be noted that the operation due to the vibration control program 41 will be described later.

The sound control program 42 is a program related to the operation of generating a sound for annunciation in, for example, a chance of incoming or a chance when the alarm time has come.

The configuration information database 43 is a database of storing/keeping the information such as ON/OFF setting of an annunciation with the vibration, a configuration related to the vibration pattern described later, or the alarm time received from the user.

The communication control section 50 is provided with a configuration for the smartphone 1 to make a call with other devices. In the present embodiment, the communication control section 50 outputs incoming information to the CPU 10 in response to incoming from other terminal.

It should be noted that whether the communication control section 50 is configured as a normal voice call or an IP phone using the Internet can arbitrarily be designed.

Further, the communication control section 50 has a function of incoming and transmitting a mail, and also outputs the information related to the incoming and the transmission to the CPU 10.

The alarm 60 is a device for outputting a sound from a speaker (not shown) at the alarm time to announce coming of the alarm time based on the information from the CPU 10 functioning as the preset time coming detector.

The timepiece 61 is a device for measuring the current time and date as the time-and-date information in terms of year, month, day, hour, minute, and second.

In the embodiment, the time-and-date information is supplied from the timepiece 61 to the CPU 10 every predetermined timing.

The first vibration motor 71 and the second vibration motor 72 (of a second vibration motor 73 described later) function as a vibration generation device for generating the vibration in the smartphone 1 in the case in which the vibration-ON setting has been made.

It should be noted that details of each of the vibration motors will be described later.

The input/output section 80 is constituted by the touch panel 8 for information input and a liquid crystal display section 82 for performing display, and functions as an input receiver.

The touch panel 8 detects a touch or a press by the user using a rod member for an operation or using the user's fingertips to thereby receive the operation on the smartphone 1 from the user.

The liquid crystal display section 82 is a confirmation screen for the input information input by the user. Further, the liquid crystal display section 82 is a screen for displaying output information as a result obtained by the CPU 10 performing the arithmetic operation based on the data input by the user.

The bus 90 is a common channel for connecting the constituents described above to each other and exchanging the data of the respective constituents in the smartphone 1.

Figure 3A:
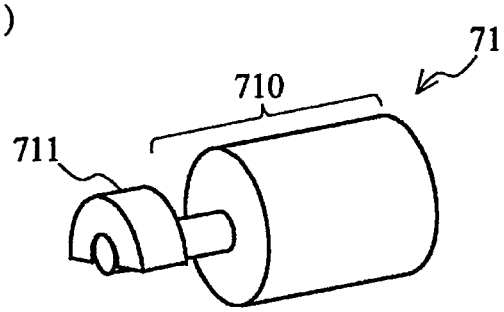
FIGS. 3A through 3C are each a schematic external configuration diagram of a vibration motor.
Figure 3B:
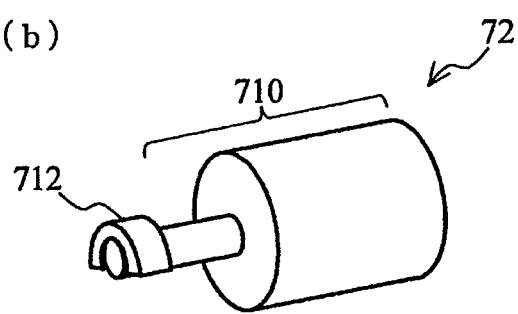
Figure 3C:
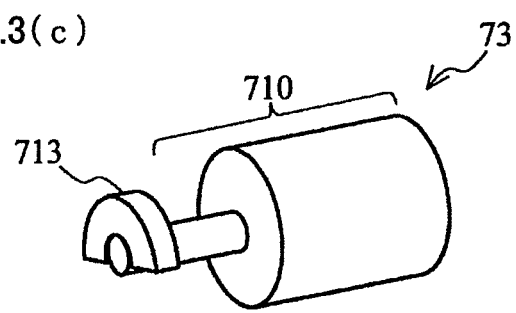

FIGS. 3A through 3C are each a schematic external configuration diagram of the first vibration motor 71 and the second vibration motor 72 (73) provided to the smartphone 1 to which the present embodiment is applied.

FIG. 3A is a schematic external configuration diagram of the first vibration motor 71.

FIG. 3B is a schematic external configuration diagram of the second vibration motor 72.

FIG. 3C is a schematic external configuration diagram of the second vibration motor 73 as a modified example of the second vibration motor.

Firstly, the first vibration motor 71 will be described using FIG. 3A.

The first vibration motor 71 is a vibration motor constituted by at least a motor 710 and a first eccentric weight 711.

Bearings are fixed to the inside of the motor 710, and the bearings axially support a rotary shaft in a rotatable manner. Further, the first eccentric weight 711 is fixed to the rotary shaft of the motor 710.

In the present embodiment, in order to give notice of incoming and coming of the alarm time, the first vibration motor 71 is used.

Then, the second vibration motor 72 will be described using FIG. 3B.

The second vibration motor 72 includes at least a motor 710 the same in standard as the first vibration motor 71, and a second eccentric weight 712 smaller in radius than the first eccentric weight 711. According to this configuration, the second eccentric weight 712 of the second vibration motor 72 becomes lighter in weight than the first eccentric weight 711 of the first vibration motor 71. Therefore, there is obtained a configuration in which the first vibration motor 71 and the second vibration motor 72 are different in time constant from each other.

In the present embodiment, the second vibration motor 72 is used as an annunciator for informing the user him- or herself of the fact that the user has touched the touch panel 8 (the input/output section 80) of the smartphone 1 with a finger and then the smartphone 1 has detected the input by the touch.

According to the configuration of making the weight of the second eccentric weight 712 lighter, the time constant of the second vibration motor 72 becomes smaller. Then, in the case of driving the first vibration motor 71 and the second vibration motor 72 with the same voltage, the second vibration motor 72 becomes better in response performance, and at the same time, the current consumption in particular in the start-up of the vibration can be reduced.

Then, the second vibration motor 73 as a modified example of the second vibration motor will be described using FIG. 3C.

The second vibration motor 73 is provided with a configuration including at least a motor 710 the same in standard as the first vibration motor 71, and a second eccentric weight 713 shorter in length in the axial direction of the first eccentric weight 711 than the first eccentric weight 711. According to this configuration, the second eccentric weight 713 of the second vibration motor 73 becomes lighter than the first eccentric weight 711 of the first vibration motor 71. Therefore, there is obtained a configuration in which the first vibration motor 71 and the second vibration motor 73 are different in time constant from each other.

It should be noted that although the embodiment will hereinafter be described using only the second vibration motor 72, the second vibration motor 73 can be adopted instead of the second vibration motor 72 in all of the described contents. The description of the second vibration motor 72 should be regarded as the description of the second vibration motor 73 unless particularly described, and regarding the drawings, the reference numeral is provided and the description will be omitted.

Although in the example described above, the weight is adjusted so that the weight of the second eccentric weight 712 becomes lighter than the weight of the first eccentric weight 711 by making the volume of the second eccentric weight 712 provided to the second vibration motor 72 smaller, the invention is not limited to this example.

For example, it is possible to adopt a configuration in which the material from which the first eccentric weight 711 is manufactured and the material from which the second eccentric weight 712 is manufactured are different from each other. Thus, even if the first eccentric weight 711 and the second eccentric weight 712 are the same in volume, it is possible to obtain the configuration in which the weight of the second eccentric weight 712 is lighter than the weight of the first eccentric weight 711.

Alternatively, it is also possible to obtain the configuration in which the size not only of the second eccentric weight 712 but also of the whole of the second vibration motor 72 is made smaller than the size of the whole of the first vibration motor 71 to thereby make the weight of the second vibration motor 72 lighter than the weight of the first vibration motor 71, and thus the torque of the second vibration motor 72 becomes weaker within a range in which the time constant of the second vibration motor 72 can be set smaller.

According to the configuration described above, in the present embodiment, it is possible to reduce the torque of the second vibration motor 72 to be weaker than that of the first vibration motor 71 to thereby reduce the power consumption.

As described above, in the present embodiment, an annunciation with a strong vibration is performed using the first vibration motor 71. In contrast, an annunciation different from the annunciation using the first vibration motor 71 is performed using the second vibration motor 72 smaller in time constant than the eccentric weight 711 of the first vibration motor 71.

According to this configuration, it is possible to perform an annunciation with the vibration high in quick response/response performance with respect to other events, the intervals of which are short, and which need to be announced with the vibration generated at the same time as the occurrence of the event, while enabling the annunciation with the strong vibration.

In the present embodiment, the description will be presented using the case, in which incoming ("(i)" described above) and coming of the alarm time ("(ii)" described above) are set as the first events, the annunciation of which is performed using the first vibration motor 71, as an example.

It should be noted that in the case in which incoming is the first event, the moment when the CPU 10 detects incoming to the smartphone 1 is defined as the moment when the first event occurs, and the period during which the incoming continues from the moment when the first event occurs is defined as a first event annunciation period.

Further, in the case in which coming of the alarm time is the first event, the moment when the CPU 10 detects coming of the alarm time is defined as the moment when the first event occurs, and a predetermined period from the moment when the first event occurs is defined as the first event annunciation period. It should be noted that it is possible to adopt a configuration in which the predetermined period is set in advance to one minute, three minutes, five minutes, or the like from the occurrence of the event, or it is also possible to adopt a configuration in which setting of the predetermined time is received from the user when receiving the setting of the alarm time or the like.

Further, in the present embodiment, the description will be presented using the case, in which a touch or a press ("(iv)" described above) is set as the second event, the annunciation of which is performed using the second vibration motor 72 (73), as an example. In this case, the moment when the touch panel 8 detects a touch or a press is defined as the moment when the second event occurs, and the period during which the touch or the press is performed is defined as a second event annunciation period.

In the smartphone 1 according to the present embodiment, there is provided a vibration mode of "making an annunciation by vibrating the smartphone 1 when incoming occurs." Setting of this mode is performed by the smartphone 1 receiving setting such as "when incoming occurs: vibration ON" from the user via the input/output section 80, and then storing the information of the setting in the configuration information database 43.

In the case in which the vibration setting with respect to incoming is stored as the ON state, in the present embodiment, the smartphone 1 drives the first vibration motor 71 to generate the vibration when incoming is detected.

It should be noted that an action performed by the smartphone 1 will hereinafter be described assuming that the action performed by the smartphone 1 is the same as the action performed by the CPU 10 of the smartphone 1 in the case in which no particular discrimination is required.

Similarly, in the smartphone 1 according to the present embodiment, there is provided a vibration mode of "making an annunciation by vibrating the smartphone 1 when the alarm time comes." Setting of this mode is also performed by the smartphone 1 receiving setting such as "alarm: vibration ON" from the user via the input/output section 80, and then storing the information of the setting in the configuration information database 43.

In the case in which the vibration setting with respect to the alarm is stored as the ON state, in the present embodiment, the smartphone 1 drives the first vibration motor 71 to generate the vibration when coming of the alarm time is detected.

Similarly, in the smartphone 1 according to the present embodiment, there is provided a vibration mode of "making an annunciation by vibrating the smartphone 1 in the case in which the touch panel 8 has detected a touch or a press." Setting of this mode is also performed by the smartphone 1 receiving setting such as "screen touch: vibration ON" from the user via the input/output section 80, and then storing the information of the setting in the configuration information database 43.

In the case in which the vibration setting with respect to the screen touch is stored as the ON state, in the present embodiment, the smartphone 1 drives the second vibration motor 72 to generate the vibration when a touch on the screen is detected. A touch is used in the same sense as a press or a contact by a finger of the user.

It should be noted that in the present embodiment, there is adopted a configuration in which the vibration ON setting described above and vibration OFF setting can be selected.

Further, although in the present embodiment, the first event and the second event are assumed to be the contents described above, the invention is not limited to this configuration. Besides the above, the correspondence relationship between the vibration and the event requested by the user can arbitrarily be set.

In that case, it is advisable to store a list of events, which can generally occur and can be announced using the vibration, in the configuration information database 43 of the storage section 40 of the smartphone 1 in advance. Further, it is sufficient to adopt a configuration in which it is possible for the user to select and then set the correspondence relationship between the vibration motors and the events when performing a variety of settings of the smartphone 1.

Alternatively, it is possible to adopt a configuration in which the registration of a user unique event can be received besides the events stored in the storage section 40, and to adopt a configuration of storing the setting of combining the event and the vibration motors with each other in the configuration information database 43.

Taking the usage scene of the smartphone 1 into consideration, there is a high possibility that the second event such as a touch (contact) or a press of the touch panel 8 more frequently occurs than the first event such as incoming or coming of the alarm time. In other words, there is a high possibility that the second vibration motor 72 is more frequently driven than the first vibration motor 71.

Regarding the second vibration motor 72 having such a high use frequency, it is possible to reduce the power consumption necessary for driving the second vibration motor 72 by decreasing the weight and the inertia moment of the second eccentric weight 712, or by reducing the torque of the second vibration motor 72 within the range in which no problem occurs in use in addition to decreasing the weight and the inertia moment of the second eccentric weight 712. Therefore, the power consumption reduction effect of the smartphone 1 as a whole can further be enhanced.

The description is hereinabove presented with a focus on the fact that the vibration is generated by driving the first vibration motor 71 for generating a strong vibration when incoming occurs or the alarm time comes. However, in the case in which the user puts smartphone 1 in a pocket but does not directly wear the smartphone 1, the case in which the user puts the smartphone 1 on a desk, or the case in which the user operates the smartphone 1 in hand, the strong vibration of the smartphone 1 is not required in many cases. Rather, the strong vibration of the smartphone 1 generated in the state of being put on the desk can be a factor of generating an uncomfortable sound for the user due to the contact between the desk and the smartphone 1. Further, the strong vibration of the smartphone 1 in the state in which the user holds the smartphone 1 in hand becomes an excessive vibration for the user in operation, and can be a factor of providing the user with astonishment or an uncomfortable feeling.

On the assumption of such cases, the smartphone 1 is made capable of receiving the selection by the user that the second vibration motor 72 is driven when incoming occurs or the alarm time comes. Thus, it is possible to resolve that the user and those around the user feel uncomfortable, and at the same time achieve reduction of the current consumption.

Alternatively, it is also possible to arrange that a sensor not shown provided to the smartphone 1 detects the attitude of the smartphone 1, then the smartphone 1 determines whether the smartphone 1 is put in the pocket (in a vertical state), the smartphone 1 is put on the desk, or the smartphone 1 is held in hand (in a horizontal state) based on the detection result to select the drive of the second vibration motor 72 when incoming occurs or the alarm time comes instead of the selection by the user.

(Arrangement of Vibration Motors)

The first vibration motor 71 and the second vibration motor 72 described above are incorporated by the smartphone 1 in such a manner as follows.

Figure 4:
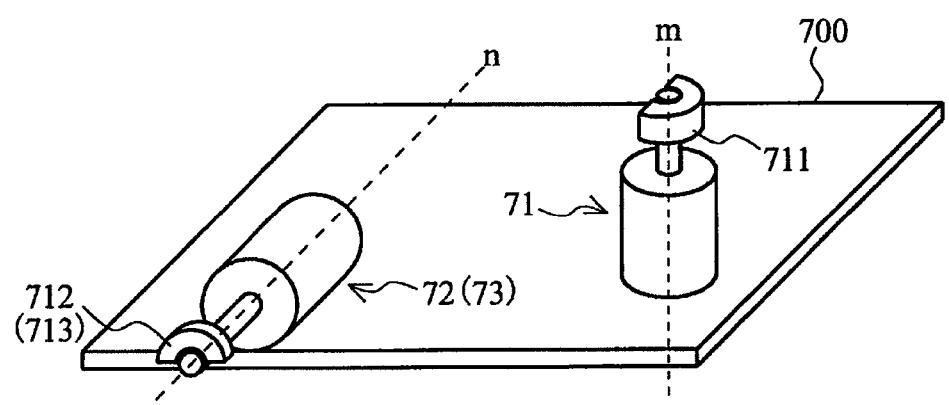
FIG. 4 is a diagram for explaining a vibration generation device.

FIG. 4 is a diagram for explaining the vibration generation device provided to the smartphone 1 to which the present embodiment is applied.

It should be noted that the dotted line m represents the axis line of the rotary shaft of the first vibration motor 71, and the dotted line n represents the axis line of the rotary shaft of the second vibration motor 72, as imaginary axis lines.

As shown in FIG. 4, the first vibration motor 71 and the second vibration motor 72 are loaded on a substrate 700 for an electronic circuit as an example, and are fixed by, for example, cream solder to thereby be mounted on a surface of the substrate 700.

On that occasion, the first vibration motor 71 is fixed to the substrate 700 so that the axis line (the dotted line m) of the rotary shaft coincides with the thickness direction of the substrate 700. At the same time, the second vibration motor 72 is fixed to the substrate 700 so that the axis line (the dotted line n) of the rotary shaft becomes parallel to the fixation surface of the substrate 700.

It should be noted that although in the example shown in FIG. 4, the angle formed between the axis line (the dotted line m) of the rotary shaft of the first vibration motor 71 and the axis line (the dotted line n) of the rotary shaft of the second vibration motor 72 is a right angle, it is not necessarily required to dispose the first vibration motor 71 and the second vibration motor 72 as to form the right angle.

Therefore, it is preferable for the second vibration motor 72 to be fixed to the reverse side of the liquid crystal display section 82 in the state of setting the axis line (the dotted line n) of the rotary shaft in a direction parallel to the panel surface of the liquid crystal display section 82 as described above.

By adopting such an arrangement, namely by setting the direction of the vibration generated by the second vibration motor 72 to the direction perpendicular to the surface of the liquid crystal display section 82 (i.e., the direction in which the liquid crystal display section 82 (a panel) is deflected), it becomes possible for the vibration generated by the second vibration motor 72 to be able to efficiently vibrate the liquid crystal display section 82 even if the vibration generated by the second vibration motor 72 is weak.

Further, the arrangement on the substrate 700 is not limited to the positional relationship shown in FIG. 4. For example, if the substrate 700 has a rectangular shape, the first vibration motor 71 and the second vibration motor 72 can diagonally be arranged, or can be arranged in the short side direction or the longitudinal direction. If the substrate 700 has a roughly circular shape, the first vibration motor 71 and the second vibration motor 72 can be arranged in a variety of positional relationships.

Alternatively, in contrast to the above, it is also possible to adopt a configuration in which both of the vibration motors are fixed to the substrate 700 so that the axis line (the dotted line n) of the rotary shaft of the second vibration motor 72 coincides with the thickness direction of the substrate 700, and the axis line (the dotted line m) of the rotary shaft of the first vibration motor 71 becomes parallel to the fixation surface of the substrate 700.

In either of the cases, the substrate 700 is disposed on the smartphone 1 so that the thickness direction of the substrate 700 and the thickness direction of the smartphone 1 coincide with each other. By disposing the first vibration motor 71 and the second vibration motor 72 in such a manner as described above, the arrangement surface of the substrate 700 on which the first vibration motor 71 and the second vibration motor 72 are disposed and the display surface of the liquid crystal display section 82 become roughly parallel to each other. According to this configuration, the vibrations by the first vibration motor 71 and the second vibration motor 72 propagate to the liquid crystal display section 82 via the substrate 700.

As described above, in the smartphone 1 according to the present embodiment, the rotary shaft of the first vibration motor 71 is disposed so as to become perpendicular to the display surface of the liquid crystal display section 82 of the smartphone 1. In contrast, the rotary shaft of the second vibration motor 72 is disposed so as to become parallel to the display surface of the liquid crystal display section 82 of the smartphone 1.

Further, the first eccentric weight 711 and the second eccentric weight 712 are disposed so as to be different in disposition direction with respect to the substrate 700 from each other. Therefore, the directions of the vibrations of the substrate 700 (the display surface of the liquid crystal display section 82) generated by the vibrations of the respective eccentric weights propagating to the substrate 700 are also different from each other. As a result, the direction of the vibration generated by the smartphone 1 vibrating the first vibration motor 71 and the direction of the vibration generated by vibrating the second vibration motor 72 can be made different from each other.

According to this configuration, it is possible to make the direction of the vibration and the way of propagating the vibration in the smartphone 1 different between the case of announcing the first event and the case of announcing the second event. In other words, it is possible to make it easier to distinguish the event having occurred due to the difference in vibration between the events.

Further, it is tentatively conceivable that the first event and the second event occur at roughly the same time, and the first vibration motor 71 and the second vibration motor 72 are driven at the same time. In that case, due to the difference in vibration direction of the smartphone 1 between the vibration motors, it is possible to generate a variety of vibrations different in way of propagating from each other by the combination of the vibration motors.

As described above, in the present embodiment, since the variations on the vibration generated by the smartphone 1 increase, it is possible to diversify the information which can be communicated to the user using the vibration.

MODIFIED EXAMPLES

Figure 5A:
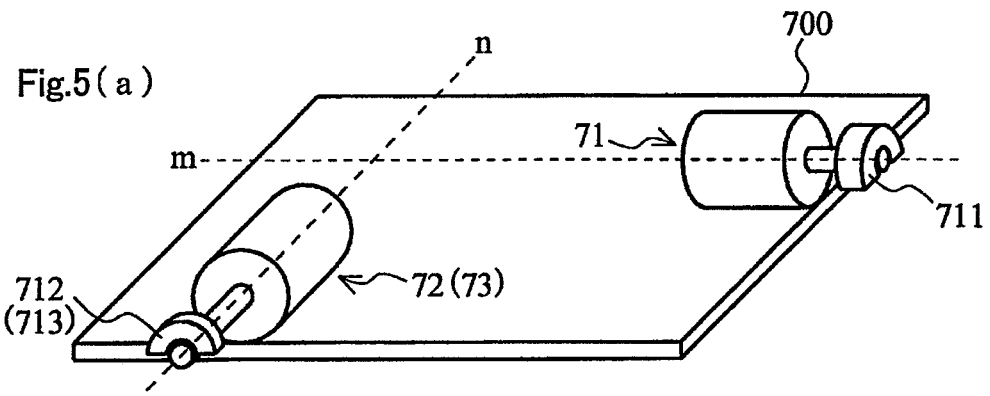
FIGS. 5A through 5C are each a diagram for explaining a modified example of the vibration generation device.
Figure 5B:
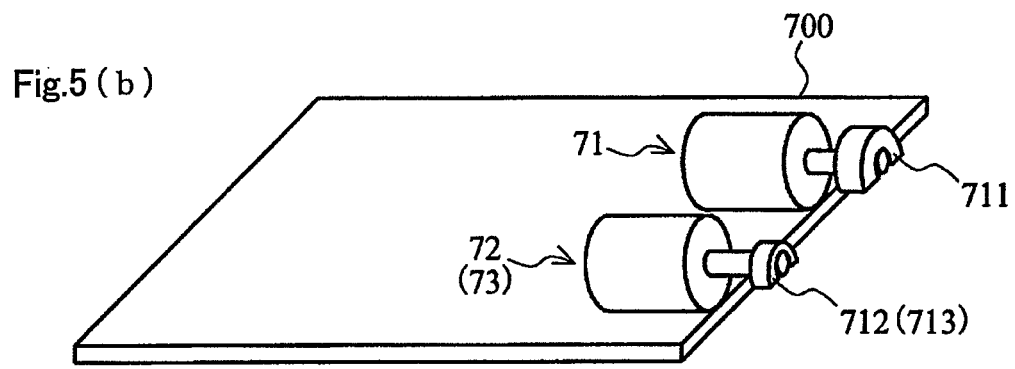
Figure 5C:
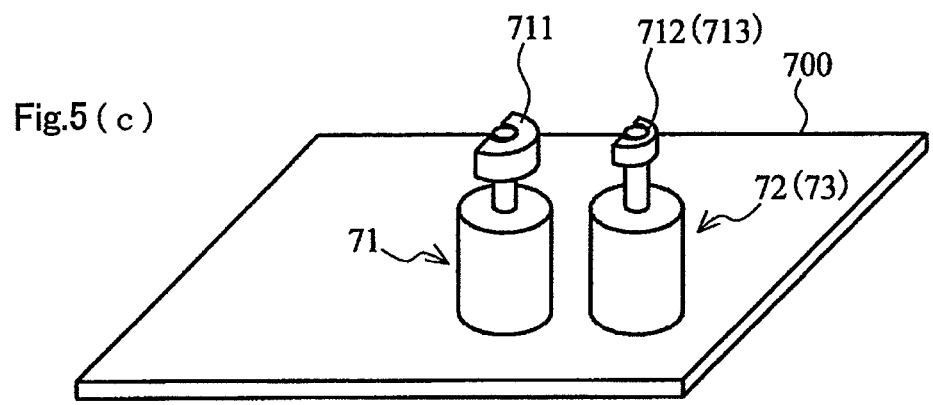

FIGS. 5A through 5C are each a diagram for explaining a modified example of the present embodiment described above.

As shown in FIGS. 5A and 5B, the first vibration motor 71 and the second vibration motor 72 are fixed to the substrate 700 so that the axis lines of the rotary shafts of the first vibration motor 71 and the second vibration motor 72 both become parallel to the fixation surface of the substrate 700, and at the same time the axis line (the dotted line m) of the rotary shaft of the first vibration motor 71 and the axis line (the dotted line n) of the rotary shaft of the second vibration motor 72 have an angle.

It should be noted that as shown in FIG. 5A, it is more preferable for both of the vibration motors (71, 72) to be disposed so that an angle formed between both of the axis lines (the dotted line m and the dotted line n) becomes a roughly right angle.

As described above, in the smartphone 1 according to the present embodiment, the rotary shafts of the first vibration motor 71 and the second vibration motor 72 are both disposed so as to become parallel to the display surface of the liquid crystal display section 82 of the smartphone 1.

Therefore, it is possible to efficiently generate the vibrations without thickening the thickness of the smartphone 1.

Alternatively, it is also possible for the first vibration motor 71 and the second vibration motor 72 to be fixedly disposed so that the axis line directions of the rotary shafts of the first vibration motor 71 and the second vibration motor 72 both coincide with the thickness direction of the substrate 700.

Incidentally, the first vibration motor 71 and the second vibration motor 72 are hereinabove described using the rotary-type motor for rotating the eccentric weight with the centroid decentered with respect to the rotary shaft as an example, but are not limited to this example. It is also possible to use a linear-type motor for reciprocating a weight in a horizontal direction (a uniaxial direction) as either one or both of the motors. The linear-type motors also include an electromagnetic linear motor driven by electromagnetic force, and a type of generating the vibration due to deformation of a piezoelectric element.

In the case of adopting the linear-type motor as either one of the motors, it is desirable to use the linear-type motor as the second vibration motor 72. In this case, it is also preferable that the second vibration motor 72 is smaller in time constant than the first vibration motor 71, and has good response performance.

The upper limit of the frequency, the vibration with which is assumed to be efficiently sensed by the human, is about 150 Hz, and in the case of the linear-type motor equivalently constituted by a weight and a spring, if it is attempted to vibrate (resonate) the linear-type motor at 150 Hz, the linear-type motor grows in size compared to the rotary-type motor in order to obtain strong vibration force. In contrast, in the case in which relatively weak vibration force will do, since the linear-type motor is small in size and can provide a characteristic superior in response performance, it is effective to use the linear-type motor as the second vibration motor 72 in the invention.

It is preferable for the direction of the vibration caused by the linear-type motor on this occasion to be an in-plane direction (a horizontal direction) of the touch panel, namely a direction perpendicular to the direction of the finger pressure by the user to the touch panel. According to this configuration, it is also possible to use a lateral force field phenomenon, and it becomes possible to provide the finger of the user with a variety of feelings using the vibration. Therefore, when the user touches the touch panel with the finger, and then the input by the touch is communicated to the user, a variety of feelings can be communicated.

On the similar idea, it is also effective to exchange the roles of the first vibration motor 71 and the second vibration motor 72 in FIG. 4 for each other. Specifically, although in FIG. 4, the first vibration motor 71 is disposed so that the axis line (the dotted line m) of the rotary shaft coincides with the thickness direction of the substrate 700, and the second vibration motor 72 is disposed so that the axis line (the dotted line n) of the rotary shaft becomes parallel to the fixation surface of the substrate 700, it is also possible to dispose the first vibration motor 71 so that the axis line (the dotted line n) of the rotary shaft becomes parallel to the fixation surface of the substrate 700, and dispose the second vibration motor 72 so that the axis line (the dotted line m) of the rotary shaft coincides with the thickness direction of the substrate 700. It should be noted that it is desirable here that the second vibration motor 72 is a flat-type motor in which the length in the axis line direction of the rotary shaft is shorter than the length of the outer diameter. In such a flat-type motor as described above, it is possible to suppress the thickness of the electronic apparatus to achieve reduction in thickness. Further, in the electronic apparatus, a space can be provided with relative ease in the plane in a direction perpendicular to the thickness direction, namely in the in-plane direction of the substrate 700 compared to the thickness direction, and therefore, there is no problem if the outer diameter of the second vibration motor 72 increases to some extent. By making the outer diameter of the second vibration motor 72 larger (than that of the first vibration motor 71), it is possible to increase the torque, and it becomes possible to make the response performance higher (than that of the first vibration motor 71). Therefore, when the user touches the touch panel with the finger, and then the input by the touch is communicated to the user, it is possible to instantly make a response in response to the touch by the finger of the user. Obviously, it is also effective to reduce the weight of the weight of the second vibration motor.

(Vibration Patterns)

FIGS. 6A and 6B are diagrams for explaining vibration patterns related to the vibration generation device.

FIG. 6A shows a typical vibration pattern of the first vibration motor 71.

In the present embodiment, events having a relatively long annunciation duration started from the occurrence of the event such as incoming and an alarm are made to correspond to the first event.

Therefore, in the period (hereinafter referred to as the first event annunciation period) during which the smartphone 1 announces the first event, the smartphone 1 controls the power source of the first vibration motor 71 to be the ON state for a certain period to provide an ON interval, and then controls the power source to be the OFF state for a certain period to provide an OFF interval. Defining a combination of the ON interval and the OFF interval as P1, the smartphone 1 controls the first vibration motor 71 so that the combination P1 is repeated in the first event annunciation period.

FIG. 6B shows typical vibration patterns of the second vibration motor 72.

In the present embodiment, events having a relatively short period during which the annunciation of the event continues such as a touch and a press are made to correspond to the second event.

Therefore, in the period (hereinafter referred to as the second event annunciation period) during which the smartphone 1 announces the second event as represented by the pattern A, the smartphone 1 controls the power source of the second vibration motor 72 to be the ON state for a certain period to provide an ON interval, and then controls the power source to be the OFF state for a longer period than the period, in which the power source is controlled to be the ON state, to provide an OFF interval. Defining a combination of the ON interval and the OFF interval as P2, the smartphone 1 controls the second vibration motor 72 so that the combination P2 is repeated in the second event annunciation period.

Further, as represented by the pattern B, it is also possible for the smartphone 1 to obtain a combination P3 in which the control of frequently switching the power source of the second vibration motor 72 between the ON state and the OFF state for a certain period (e.g., switching the power source about three through five times in the ON interval of 0.5 second) is performed to thereby provide the ON interval having a short ON/OFF cycle, and then, the power source is controlled to be the OFF state for a certain period longer than the ON interval to thereby provide the OFF interval in the second event annunciation period. It should be noted that in the normal ON/OFF switching, the ON interval of 0.5 seconds through 1 second and the OFF interval of 0.5 seconds through 1 second are alternately repeated.

Alternatively, as represented by the pattern C, it is also possible to adopt a configuration of continuing to perform the control of frequently switching the power source of the second vibration motor 72 between the ON state and the OFF state during the second event annunciation period.

It should be noted that in either of the cases shown in FIGS. 6A and 6B, the number of peaks representing the ON state (in vibration) of the power source and the number of bottoms representing the OFF state are illustrative only, and are not limited to the drawings.

Alternatively, it is also possible to adopt a configuration (not shown) of setting the power source of the vibration motor to the ON state at the same time as the occurrence of the event in either of the first vibration motor 71 and the second vibration motor 72, and subsequently continuing to drive the vibration motor during the period in which the event is announced instead of the configuration including the vibration pattern using the combination of the ON interval and the OFF interval described above.

Further, the vibration patterns described above are stored in the configuration information database 43 (FIG. 2), and there is adopted a configuration in which the vibration patterns are associated with the respective events similarly stored. In such a case, it is also possible to adopt a configuration in which the correspondence between the events and the vibration patterns is received from the user and is then stored. Alternatively, it is also possible to adopt a configuration in which the correspondence between the vibration patterns and the events is set in advance in the smartphone 1.

At the occasion that the smartphone 1 detects the first event and the second event to make an annunciation, in the case in which the chances of occurrences or annunciation periods of both of the events do not overlap each other, it is sufficient for the vibration motors to announce the respective events with the vibrations using either of the vibration patterns described above.

In the present embodiment, in the case in which the smartphone 1 detects the first event and the second event in an overlapping manner, the smartphone 1 makes an accommodation between the vibration motors for announcing the respective events as follows. That is, in the case in which the smartphone 1 has detected the other event during the annunciation based on one event, the smartphone 1 makes either one of the following two accommodations regarding the annunciation of the other event detected.

It should be noted that as the case in which the first event and the second event occur in an overlapping manner, it is possible to cite a situation that, for example, "the surface of the touch panel 8 has been touched (the second event) at the same timing as the detection of incoming (the first event)."

A first accommodation is an accommodation of avoiding an overlap of the ON intervals of the first vibration motor 71 and the second vibration motor 72. In this accommodation, the smartphone 1 controls the vibration motor for announcing the other event detected later so that the ON interval related to the other event detected later starts in the OFF interval related to the one event detected earlier.

A second accommodation is an accommodation of avoiding an overlap of the OFF interval of one of the first vibration motor 71 and the second vibration motor 72 and the ON interval of the other thereof. In this accommodation, the smartphone 1 controls the vibration motor for announcing the other event detected later so that the ON interval related to the other event detected later starts in the ON interval related to the one event detected earlier.

It should be noted that it is also possible to adopt a configuration (with no accommodation) in which the smartphone 1 does not perform the first accommodation or the second accommodation described above, but starts the ON interval related to the other event irrespective of the ON interval or the OFF interval related to the one event having occurred earlier.

FIGS. 7A through 7D are diagrams for explaining the vibration states of the vibration motors related to the first accommodation, the second accommodation, and no accommodation described above.

Firstly, the case of the first accommodation will be described.

Figure 7A:
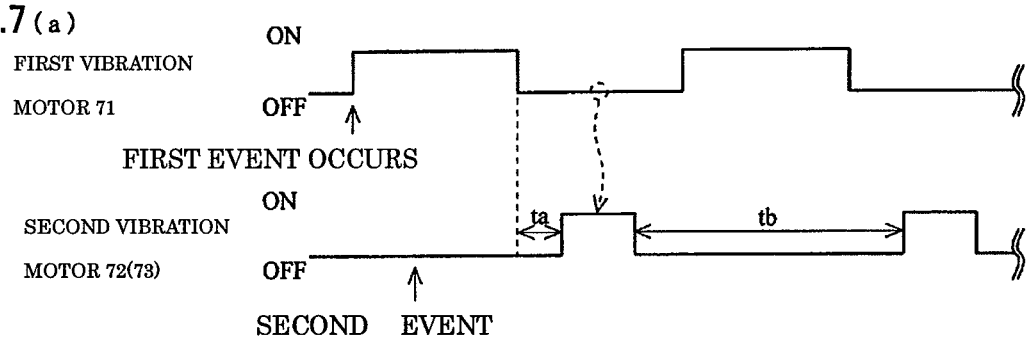
FIGS. 7A through 7D are each a diagram for explaining a vibration state related to the vibration generation device.

FIG. 7A shows an example in which the smartphone 1 performs ON control on the second vibration motor 72 when OFF control is performed on the first vibration motor 71.

As shown in FIG. 7A, the smartphone 1 does not immediately drive the second vibration motor 72 even if the second event has occurred during the drive period (the ON interval) of the first vibration motor 71 based on the first event. In other words, the smartphone 1 controls the second vibration motor 72 so that the ON intervals of the first vibration motor 71 and the second vibration motor 72 do not overlap each other.

Further, the smartphone 1 does not perform the ON control on the second vibration motor 72 immediately after the OFF control on the first vibration motor 71, but performs the ON control on the second vibration motor 72 with a predetermined time lag ta. It should be noted that the smartphone 1 controls the clearance tb from the OFF control on the second vibration motor 72 to the subsequent ON control so that the ON interval of the first vibration motor 71 and the ON interval of the second vibration motor 72 do not overlap each other even if the time lag ta is provided.

By providing the time lag ta, the vibration based on the first vibration motor 71 and the vibration based on the second vibration motor 72 do not consecutively occur, and there is created an interval without the vibration. Therefore, it is possible to correctly inform the user of the fact that the second event has occurred or is occurring during the occurrence of the first event.

It should be noted that it is possible to adopt a configuration of performing the ON control on the second vibration motor 72 immediately after performing the OFF control on the first vibration motor 71 without providing the predetermined time lag ta.

As described above, in the example shown in FIG. 7A, since the smartphone 1 performs the control of not providing the interval in which the first vibration motor 71 and the second vibration motor 72 are driven concurrently, it is possible to suppress the maximum current consumption appearing in the case of driving the first vibration motor 71 and the second vibration motor 72 concurrently (at the same time).

Therefore, in the present embodiment, it is possible to reduce the damage to a battery of the smartphone 1 to extend the life of the battery.

Then, the case of the second accommodation will be described.

Figure 7B:
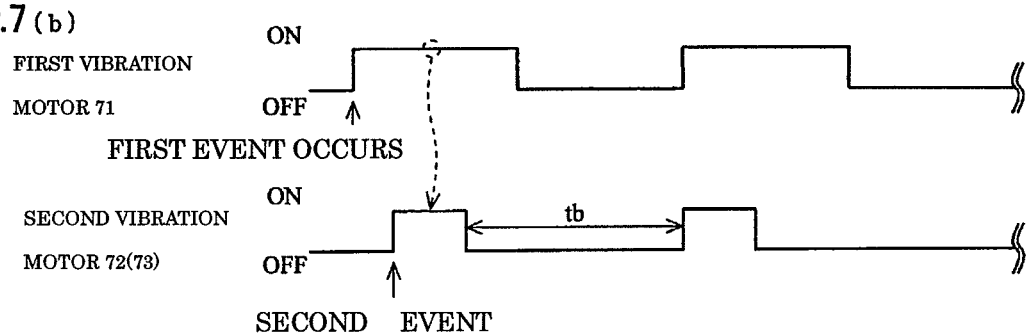
Figure 7C:
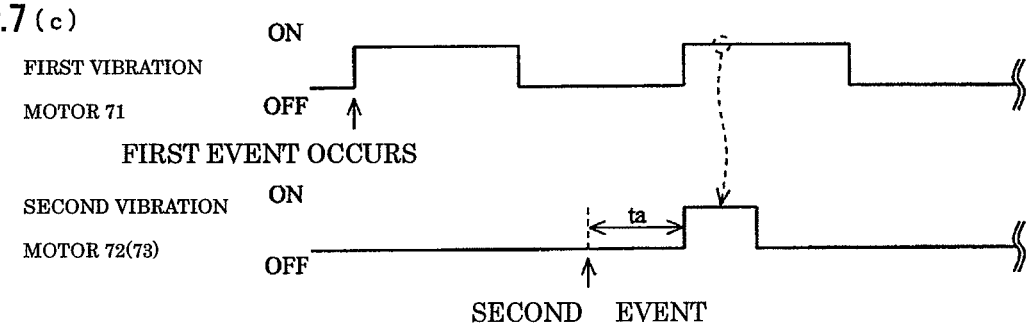

FIGS. 7B and 7C each show an example in which the smartphone 1 performs ON control on the second vibration motor 72 when ON control is performed on the first vibration motor 71.

As shown in FIG. 7B, in the case (of the ON interval) in which the timing (occurrence of the second event) at which the second event has been detected is during the drive period (the ON interval) of the first vibration motor 71 based on the first event, the smartphone 1 drives the second vibration motor 72 at the same time as the detection of the second event. In the present configuration, the smartphone 1 controls the clearance tb so that the ON interval of the first vibration motor 71 and the ON interval of the second vibration motor 72 overlap each other.

Further, as shown in FIG. 7C, the timing at which the second event has been detected is not during the drive period (in the OFF interval) of the first vibration motor 71 based on the first event, the smartphone 1 does not immediately drive the second vibration motor 72 even when the second event has been detected, but provides the time lag ta for making the vibration overlap the ON interval of the first vibration motor 71. Then, after the time lag ta has elapsed, the smartphone 1 drives the second vibration motor 72.

It should be noted that although in FIGS. 7B and 7C, the description is presented taking the case in which the pattern A (FIG. 6B) is used as the vibration pattern of the second vibration motor 72 as an example, the invention is not limited to this example. It is possible to obtain a similar configuration by using the pattern B (FIG. 6C) as the vibration pattern of the second vibration motor 72.

As described above, in the examples described with reference to FIGS. 7B and 7C, since the second eccentric weight 712 of the second vibration motor 72 is lighter than the first eccentric weight 711 of the first vibration motor 71, it is possible to make the second vibration motor 72 superior in response performance to the first vibration motor 71, and further, it becomes possible to obtain the configuration without significantly consuming the current.

Further, in the case of concurrently driving the first vibration motor 71 and the second vibration motor 72, it is possible for the smartphone 1 to generate a variety of vibrations by making the vibration patterns of the both vibration motors different from each other. Therefore, even if vibrating the second vibration motor 72 based on the second event during the drive period of the first vibration motor 71 based on the first event, it is possible to effectively inform the user of the fact that the different event is occurring due to the difference in type (pattern) of the vibration and drive timing.

Then, the case of no accommodation will be described.

Figure 7D:
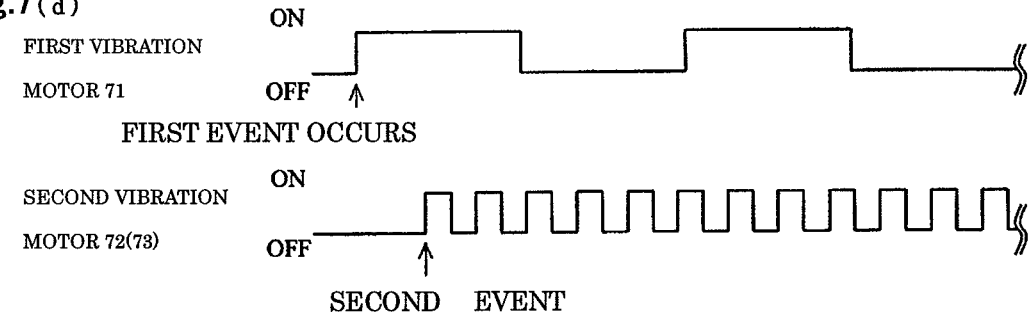

As shown in FIG. 7D, the smartphone 1 drives the second vibration motor 72 regardless of the ON interval or the OFF interval of the first vibration motor 71 even in the case in which the second event has been detected during the drive period of the first vibration motor 71. Further, subsequently, the smartphone 1 makes the second vibration motor 72 generate the vibration based on the second event regardless of the drive of the first vibration motor 71.

It should be noted that although in FIGS. 7A through 7D, there is described the case in which the smartphone 1 has detected the second event in the state in which the first event (for the first vibration motor 71) has previously been detected, the same can be applied to the case in which the second event has been detected first.

It should be noted that since the ON interval related to the first event is longer than the ON interval related to the second event, it is preferable for the smartphone 1 to be provided with a configuration capable of further selecting the following control.

That is, regarding the vibration related to the first event detected later, the smartphone 1 continues the vibration of the first vibration motor 71 as much as the ON interval of the drive pattern associated with the first event even after the ON interval of the second event detected earlier has ended. Alternatively, regarding the vibration related to the first event detected later, the vibration of the first vibration motor 71 is forcedly terminated at the same time as the end of the ON interval of the second event.

Similarly, in the first accommodation described with reference to FIG. 7A, in the case in which the second event has been detected in the OFF interval related to the first event detected earlier, the smartphone 1 immediately drives the second vibration motor 72. However, in the case in which the OFF interval of the first event has ended in the ON interval of the second event, both of the case of continuing the ON interval of the second event and the case of forcedly terminating the ON interval can be adopted.

Figure 8:
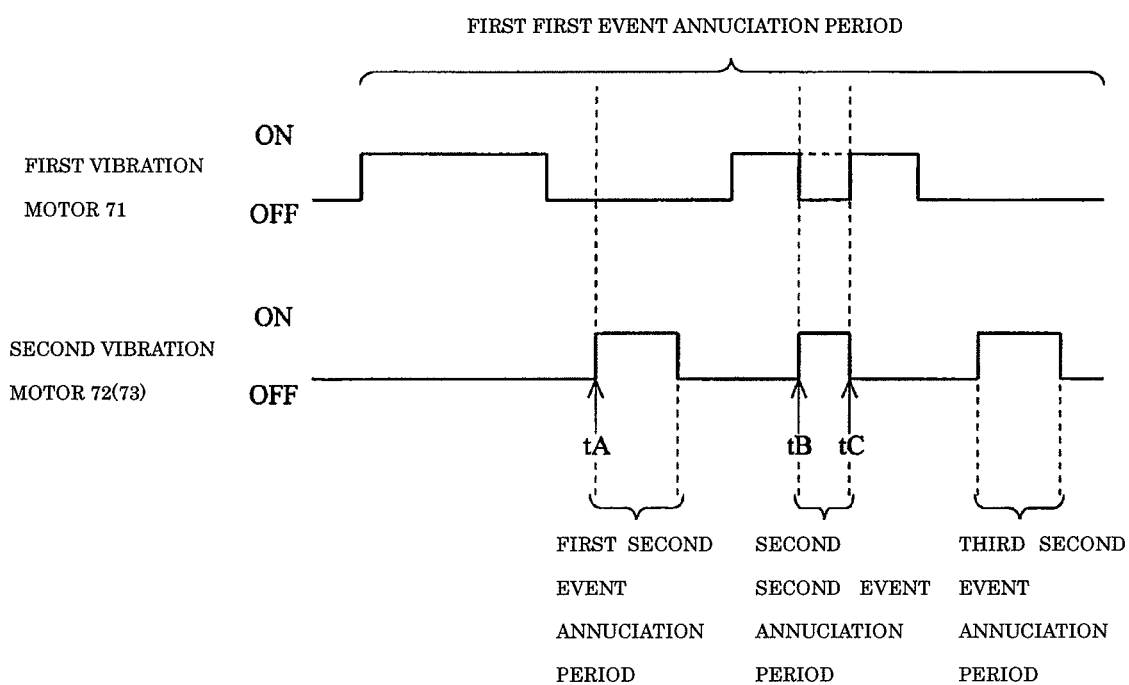
FIG. 8 is a diagram for explaining a modified example of the vibration state related to the vibration generation device.

FIG. 8 is a diagram for explaining a modified example of the vibration state described above.

The modified example explained with reference to the drawing is an example of the case of preferentially driving either one of the first vibration motor 71 and the second vibration motor 72, and stopping the other not prioritized.

In the present modified example, whether or not the vibration motor is in the ON state is always monitored with respect to the first vibration motor 71 and the second vibration motor 72. Further, the control of preferentially driving the vibration motor set to be preferentially vibrated is performed by stopping the other motor, which is currently driven.

It should be noted that the setting is received by the smartphone 1 from the user via the input/output section 80, and is then stored in the configuration information database 43. Alternatively, it is also possible to adopt a configuration in which the vibration motor to be preferentially driven (i.e., the vibration motor driving of which is not stopped even if the occurrences of the events overlap each other) is set in advance to the smartphone 1. Further, it is also possible to adopt a configuration in which the vibration motor to be preferentially driven is set in advance, and change setting by the user can be accepted.

FIG. 8 shows the drive timing in the case in which the second vibration motor 72 is set to be driven in preference to the first vibration motor 71, as an example.

It should be noted that FIG. 8 shows an example in which three second events different from each other occur in the single first event annunciation period. The "first second event annunciation period," the "second event annunciation period," and the "third second event annunciation period" each correspond to the period in which the smartphone 1 vibrates the second vibration motor 72 with either of the vibration pattern A, the vibration pattern B, and the vibration pattern C of the second vibration motor 72 described with reference to FIG. 6B.

If the first vibration motor 71 is in the OFF state (in the OFF interval in the vibration pattern of the first vibration motor 71 although the first event is occurring) when the first second event has been detected (tA), the smartphone 1 drives the second vibration motor 72.

In contrast, if the first vibration motor 71 is currently driven (in the ON interval in the vibration pattern of the first vibration motor 71) when the second event has been detected (tB), the smartphone 1 stops driving the first vibration motor 71 and then drives the second vibration motor 72.

It should be noted that it is also possible to adopt a configuration of providing a predetermined time lag to described with reference to FIG. 7C between the stoppage of the drive of the first vibration motor 71 and the drive of the second vibration motor 72.

Then, in the case in which the first event still continues at the timing (tC) when the second event has ended, the smartphone 1 drives the first vibration motor 71.

As described above, in the present modified example, the smartphone 1 is capable of correctly informing the user of the higher priority event with a vibration.

Then, the operation of the smartphone 1 described above will be described.

Figure 9:
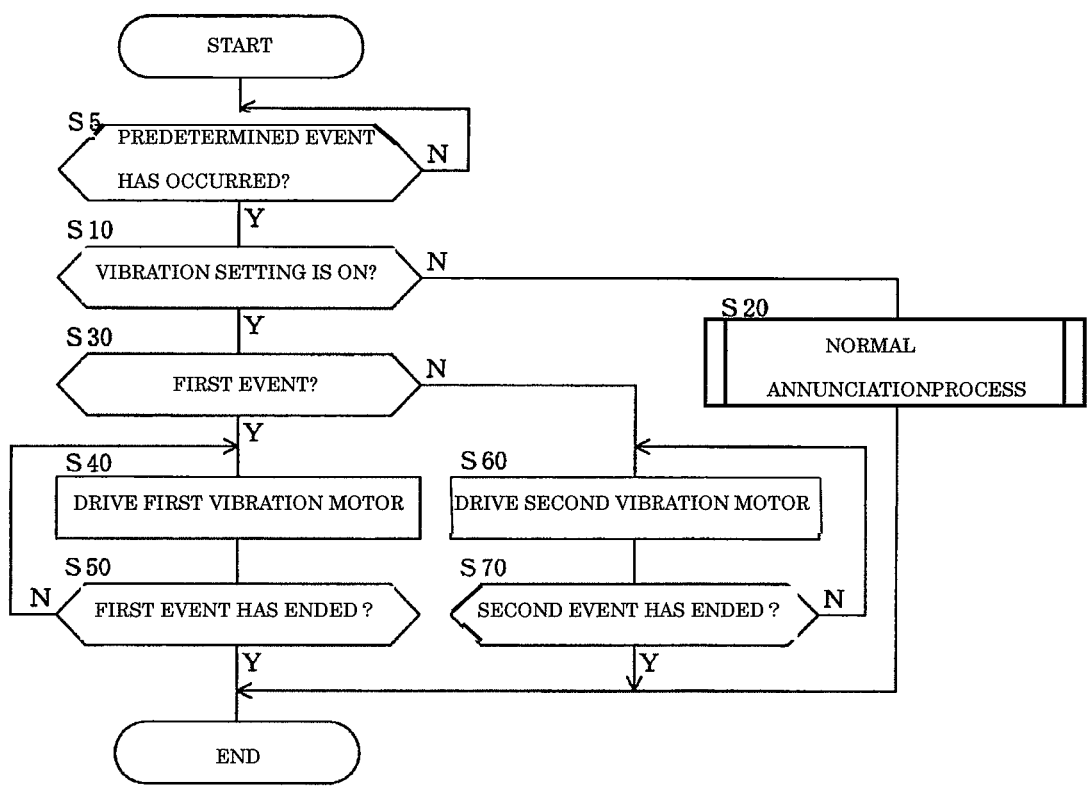
FIG. 9 is a flowchart for explaining a vibration operation related to the vibration generation device.

FIG. 9 is a flowchart for explaining a vibration operation of the smartphone 1 according to the present embodiment.

In the state in which the power of the smartphone 1 is ON, the CPU 10 of the smartphone 1 always monitors (step 5) an occurrence of a predetermined event.

It should be noted that the predetermined event in the present embodiment denotes incoming (the first event) from other terminals, coming (the first event) of the alarm time, and a touch or a press (the second event) on the touch panel 8 as described above.

In the case in which the CPU 10 determines that the predetermined event does not occur (N in the step 5), the CPU 10 continues to monitor the presence or absence of the occurrence.

In contrast, if the CPU 10 determines that the predetermined event has occurred (Y in the step 5), the CPU 10 determines (step 10) whether or not the vibration setting is set to the ON state. The vibration setting is the setting on whether or not the annunciation by vibrating the smartphone 1 is performed when some event has occurred. The CPU 10 stores the information (either one of the vibration ON setting and the vibration OFF setting) having previously been received from the user via the input/output section 80 in the configuration information database 43, and therefore makes the determination by checking the configuration information database 43. The vibration setting can be changed by the setting change from the user in accordance with the time, place, and occasion (TPO) of the usage of the smartphone 1. It should be noted that the "vibration ON setting" is the setting that the annunciation using the vibration is performed, and the "vibration OFF setting" is the setting that the annunciation using the vibration is not performed.

In the case in which the vibration setting is set to the OFF state (N in the step 10), the CPU 10 performs (step 20) a normal annunciation process as an annunciation performed using a sound, and then terminates the process related to the annunciation.

In contrast, if the CPU 10 determines that the vibration setting is set to the ON state (Y in the step 10), the CPU 10 determines (step 30) whether or not the predetermined event having occurred is the first event. The determination on whether or not the event is the first event is made by checking, for example, a list related to the events and a correspondence table showing what event corresponds to the first event (or the second event) both of which are stored in advance in the configuration database 43.

If the CPU 10 has determined that the predetermined event having occurred is the first event (Y in the step 30), the CPU 10 drives the first vibration motor 71 to generate (step 40) the vibration.

Then, the CPU 10 continues (step 50) to monitor whether or not the first event has ended, and in the period in which the first event does not end (N in the step 50), the CPU 10 returns to the step 40 to continue to drive the first vibration motor 71.

In contrast, in the case in which the CPU 10 has determined that the first event has ended (Y in the step 50), the CPU 10 terminates the annunciation process with the vibration.

If the CPU 10 determines that the predetermined event having occurred is the second event (N in the step 30), the CPU 10 drives (step 60) the second vibration motor 72. Thus, the smartphone 1 generates a weaker vibration than the vibration by the first vibration motor 71 when the second event has occurred.

Then, the CPU 10 continues (step 70) to monitor whether or not the second event has ended, and in the period in which the second event does not end (N in the step 70), the CPU 10 returns to the step 60 to continue to drive the second vibration motor 72.

In contrast, in the case in which the CPU 10 has determined that the second event has ended (Y in the step 70), the CPU 10 terminates the annunciation process with the vibration.

It should be noted that although in the embodiment described with reference to FIG. 9, the operation is described focusing attention on one event having occurred, monitoring (step 5) of whether or not the predetermined event is occurring is always performed. Therefore, in the case in which the events, which can continuously occur, have occurred one after another, or with certain intervals, the process is performed with respect to each of the events.

Therefore, it is conceivable that the second event occurs during the occurrence of the first event (or the first event occurs during the occurrence of the second event), and as a result, the first vibration motor 71 and the second vibration motor 72 are concurrently driven.

FIG. 10 is a flowchart for explaining another example of the vibration operation of the smartphone 1 according to the present embodiment.

The embodiment described with reference to FIG. 10 particularly corresponds to the operation of the combination of the vibrations described with reference to FIG. 7A, and the smartphone 1 controls the first vibration motor 71 and the second vibration motor 72 so as not to be driven at the same time. For example, the configuration can be adopted in the case in which the first event associated with the first vibration motor 71 is more important or more urgent than the second event associated with the second vibration motor 72.

It should be noted that in FIG. 10, the same operation as the operation described with reference to FIG. 9 is denoted by the same step number, and the description thereof will be omitted.

In the embodiment described with reference to FIG. 10, if the CPU 10 has determined that the predetermined event having occurred is not the first event (N in the step 30), the CPU 10 determines (step 80) whether or not the first vibration motor 71 is currently driven.

It should be noted that the state that "the first vibration motor 71 is currently driven" in the step 80 denotes the drive state of the first vibration motor 71, which has already been driven (powered on) for announcing the first event having occurred before the present event.

In the case in which the CPU 10 has determined that the first vibration motor 71 has already been driven (Y in the step 80), the CPU 10 continues to monitor the drive state of the first vibration motor 71.

In contrast, if the CPU 10 determines that the first vibration motor 71 is not currently driven (N in the step 80), the CPU 10 drives (step 60) the second vibration motor 72.

It should be noted that on this occasion, it is also possible to adopt a configuration in which the CPU 10 drives the second vibration motor 72 immediately after the determination, or it is also possible to adopt a configuration in which the CPU 10 drives the second vibration motor 72 at the timing delayed as much as the predetermined time lag ta described with reference to FIG. 7C.

Further, in the case of not providing the predetermined time lag ta, since it is conceivable that the vibration with the first vibration motor 71 and the vibration with the second vibration motor 72 consecutively occur, it is preferable to set the vibration patterns different from each other to the respective vibrations.

It should be noted that although in FIG. 10, there is described an example in which the first vibration motor 71 (for the first event) is prioritized over the second vibration motor 72 (for the second event), it is also possible to adopt a configuration in which the second vibration motor 72 is prioritized on the contrary. In that case, it is advisable to add a configuration of determining whether or not the second vibration motor 72 is currently driven before driving (step 40) the first vibration motor 71.

As described above, in the embodiment described with reference to FIG. 10, in the period in which the first vibration motor 71 is driven, since the smartphone 1 does not drive the second vibration motor 72 even if the second event has occurred, it is possible to more accurately announce the first event associated with the first vibration motor 71 using the vibration.

Further, since the two vibration motors are not driven at the same time, the power consumption can be reduced.

Further, by making the vibration patterns (the power ON/OFF cycle) different from each other, if the vibrations by the first vibration motor 71 and the second vibration motor 72 consecutively occur, the user can recognize the fact that the different events are occurring or have occurred due to the change in vibration.

Figure 11:
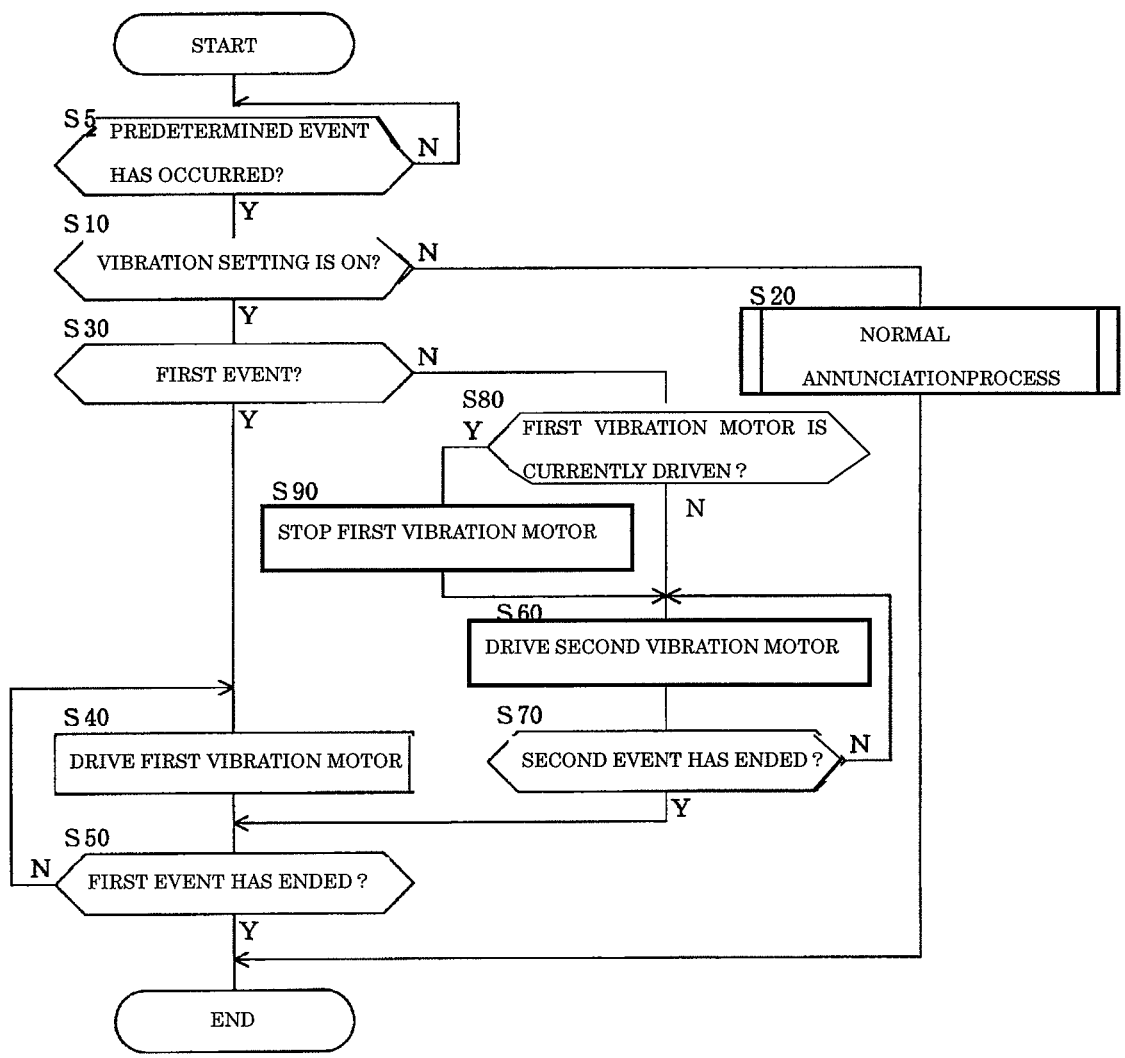
FIG. 11 is a flowchart for explaining a vibration operation related to the vibration generation device.

FIG. 11 is a flowchart for explaining the vibration operation of the smartphone 1 according to the present embodiment, and corresponds in particular to the operation of the modified example of the combination of the vibrations described with reference to FIG. 8.

Also in the present embodiment described using FIG. 11, similarly to the embodiment described with reference to FIG. 9, the smartphone 1 does not drive the first vibration motor 71 and the second vibration motor 72 at the same time.

However, in FIG. 11, there is described a configuration in which the second vibration motor 72 is driven in preference to the first vibration motor 71. Specifically, the configuration can be adopted in the case in which the second event associated with the second vibration motor 72 is more important or more urgent than the first event associated with the first vibration motor 71.

It should be noted that the same operation as the operation described with reference to FIG. 9 or FIG. 10 is denoted by the same step number, and the description thereof will be omitted.

In the embodiment described with reference to FIG. 11, if it is determined that the first vibration motor 71 has already been driven (Y in the step 80), the CPU 10 stops (step 90) the first vibration motor 71 even if the first event having ever occurred has not yet ended at that moment. The stop is so-called interrupt stop. Subsequently, the CPU 10 drives (step 60) the second vibration motor 72.

It should be noted that the state that "the first vibration motor 71 is currently driven" in the step 80 denotes the drive state of the first vibration motor 71, which has already been driven (powered on) for announcing the first event having occurred before the present event similarly to the description with reference to FIG. 10.

Then, the CPU 10 continues (step 70) to monitor whether or not the second event has ended, and if the CPU 10 determines that the second event has ended (Y in the step 70), then the CPU 10 makes the transition (step 50) to the process of determining whether or not the first event has ended in the present embodiment.

It should be noted that although in FIG. 11, there is described an example in which the second vibration motor 72 (for the second event) is prioritized over the first vibration motor 71 (for the first event), it is also possible to adopt a configuration in which the first vibration motor 71 is prioritized on the contrary.

In that case, it is advisable to add a configuration of "determining whether or not the second vibration motor 72 is already driven" before driving (step 40) the first vibration motor 71. Further, it is advisable to further add a configuration of "stopping the second vibration motor 72 and then driving the first vibration motor 71 in the case in which the second vibration motor 72 is currently driven."

As described above, in the embodiment described with reference to FIG. 11, when a certain higher priority second event has occurred, if the smartphone 1 is driving the first vibration motor 71 in response to the lower priority first event than the second event, the smartphone 1 stops driving the first vibration motor 71, and then drives the second vibration motor 72 in order to announce the second event having most recently occurred.

Therefore, since there is no chance to drive both of the vibration motors in an overlapping manner when announcing the higher priority second event associated with the second vibration motor 72, a more accurate annunciation using the vibration can be performed.

Further, since the two vibration motors are not driven at the same time, the power consumption can be reduced.

Although each of the embodiments according to the invention is hereinabove described, the invention is not limited to the embodiments or the modified examples described above, but a variety of modifications can be implemented within the scope or the spirit of the invention set forth in the appended claims.

Although in the embodiments described above, it is arranged that which one of the first vibration motor 71 and the second vibration motor 72 is used as the vibration motor to be driven in accordance with the first event or the second event can be set, it is also possible to adopt a configuration of making the combinations as follows besides this configuration.

For example, in order to generate the vibration used for announcing detection of an emergency warning such as an emergency earthquake warning, or announcing a warning to the user attempting to perform a prohibited operation or input although the operation or the input is for input, it is possible to adopt a configuration of simultaneously driving both of the first vibration motor 71 and the second vibration motor 72 as a set.

Alternatively, it is also possible to adopt a configuration in which constituents such as a contact sensor or a pressure sensor for detecting that the smartphone 1 is put on the desk or held in the hand of the user are added to the smartphone 1, and in the case in which the detection has occurred, even if the event, which is set to cause the first vibration motor 71 to be driven, has occurred, the second vibration motor 72 is driven.

Further, it is also possible to adopt a configuration in which the fact that the smartphone 1 and the user are in a noncontact state can be set as the first event.

Further, it is also possible to adopt a configuration in which the fact that the smartphone 1 and the user are in a contact state can be set as the second event.

Further, it is also possible to adopt a configuration of using both of the normal annunciation process performed using sounds and the vibration annunciation process performed using the vibrations.

What is claimed is:

1. An electronic apparatus comprising:
   a first vibration motor provided with a first weight and configured to rotate or reciprocate the first weight to generate a first vibration;
   a second vibration motor having a smaller time constant than the first vibration motor and provided with a second weight and configured to rotate or reciprocate the second weight to generate a second vibration different from the first vibration,
   an input /output section configured to enable a user to select from a list of stored events one or more first events and one or more second events different from the first events; and
   a controller configured to drive the first vibration motor with first drive pulses of constant ON/OFF intervals upon occurrence of the user-selected one or more first events and to drive the second vibration motor with second drive pulses of constant ON/OFF intervals upon occurrence of the user-selected one or more second events, the ON interval of the first drive pulses being longer than the ON interval of the second drive pulses.

2. The electronic apparatus according to claim 1, wherein the second weight is lighter in weight than the first weight.

3. The electronic apparatus according to claim 1, where the first vibration motor is a rotary-type motor, and the second vibration motor is a linear-type motor.

4. The electronic apparatus according to claim 1, wherein the first vibration motor and the second vibration motor are disposed so that a direction of the first vibration generated by the first vibration motor and a direction of the vibration generated by the second vibration motor are nonparallel to each other.

5. The electronic apparatus according to claim 1, wherein the controller is configured to perform either a first control, in which drive of the second vibration motor is halted during a drive period of the first vibration motor, or a second control, in which the second vibration motor is driven during the drive period of the first vibration motor, in a case of driving first vibration motor in preference to the second vibration motor.

6. The electronic apparatus according to claim 1, wherein:
the input/output section is configured to permit the user to input information by touch action or by press action,
the controller is configured as an incoming detector to detect an incoming communication and as a preset time detector to detect a preset time,
the first event corresponds to at least either the incoming communication detected by the incoming detector or the preset time detected by the preset time detector, and
the second event corresponds to information input by touch action or press action received by the input/output section.

7. The electronic apparatus according to claim 6, further comprising a correspondence event setting unit configured to enable the user to set and/or change the one or more first events and the one or more second events that correspond to the first vibration motor and the second vibration motor.

8. The electronic apparatus according to claim 6, where the input/out section includes a touch panel.

* * * * *